G. HEELEY.
PAYMENT IN ADVANCE METER.
APPLICATION FILED SEPT. 20, 1912.

1,235,686.

Patented Aug. 7, 1917.
2 SHEETS—SHEET 1.

G. HEELEY.
PAYMENT IN ADVANCE METER.
APPLICATION FILED SEPT. 20, 1912.
1,235,686.
Patented Aug. 7, 1917.
2 SHEETS—SHEET 2.
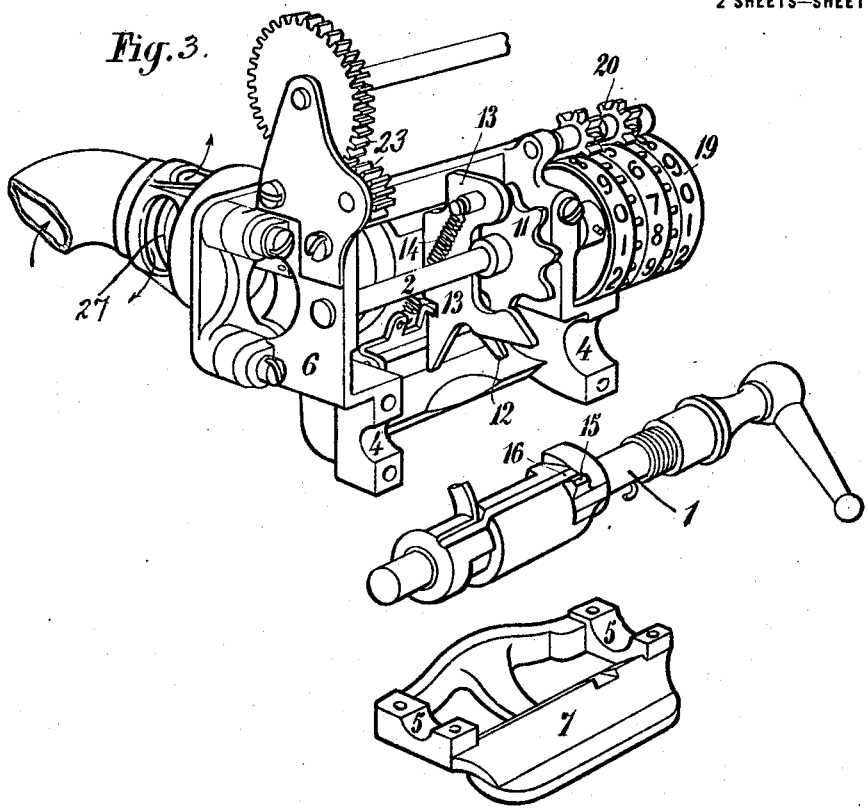
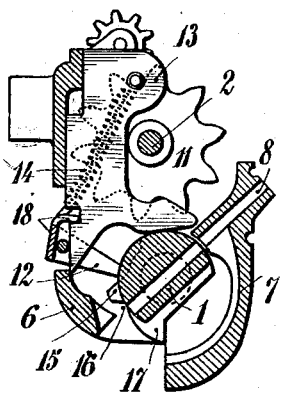 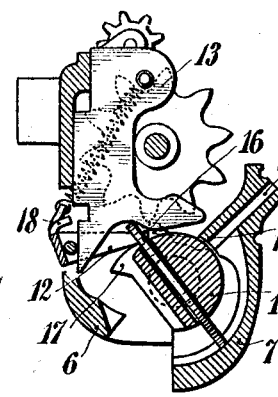 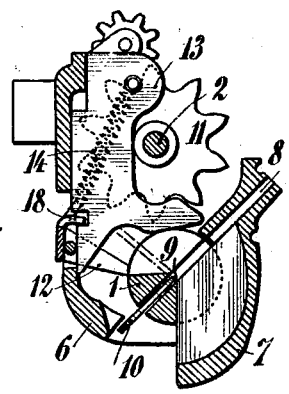

UNITED STATES PATENT OFFICE.

GEORGE HEELEY, OF PARIS, FRANCE, ASSIGNOR TO COMPAGNIE POUR LA FABRICATION DES COMPTEURS ET MATERIEL D'USINES A GAZ, OF PARIS, FRANCE.

PAYMENT-IN-ADVANCE METER.

1,235,686.  Specification of Letters Patent.  Patented Aug. 7, 1917.

Application filed September 20, 1912. Serial No. 721,482.

*To all whom it may concern:*

Be it known that I, GEORGE HEELEY, a citizen of the French Republic, residing at Paris, in France, have invented certain new and useful Improvements in Payment-in-Advance Meters, of which the following is a specification.

The mechanism forming the subject of this invention, more particularly designed for the purpose of its application to gas meters, could also be used for any other measuring apparatus such as water meters, electricity meters, etc.

The invention chiefly comprises a differential set of gear or toothed wheels, the satellites or loose pinions of which rotate to the right or to the left according as they are driven either by the wheels which themselves receive their motion from the measuring device, or by coins which having been successively introduced into the apparatus, are received in a drum, rotate with the latter when the handle is operated, and move respectively to the extent of one tooth, the ratchet wheel secured to one of the wheels of the satellites or pinion gear.

The first coin introduced brings about the opening of the valve operated by a lever which in its turn, is shifted by a driving finger made in one piece with the loose pinions. Whenever a new coin is introduced after the first one, the finger is moved farther and farther away from the lever, so that the angular distance separating it from the latter, is in proportion to the number of coins which have successively acted on the mechanism.

As the meter delivers gas, the loose pinions, and consequently the driving finger travel, in the direction opposite to that of the movement which has been imparted to them by the coins, a distance which is obviously in proportion to the number of revolutions of the measuring device, and consequently to the volume supplied. When the finger thus moved by the measuring device, returns to the position which it occupied before the introduction of the first coin, it produces a closing of the valve. It will be seen that in these conditions it is possible to regulate the ratio of the toothed wheels transmitting to the loose pinion train, the movement of the measuring device, in such manner that the valve, once opened by the introduction of one or more coins, would not close until the apparatus has supplied the quantity of gas corresponding to the amount paid in advance.

The characteristic features of the mechanism forming the subject of this invention, are not contained in the loose pinion gear, the application of which to the meter with payment in advance is known, and which has been described in the foregoing merely in order to explain the general working of the system, but consist in the arrangements which have a great importance from the point of view of the adaptation of the mechanism to any kinds of coins, of its safety against fraud and of easy access to the parts liable to be stopped by a deformed coin.

These arrangements are as follows:—

1. A combination and a method of fixing of the drum, of the plate carrying the coin slot and of a safety bolt preventing the return backward of the coins introduced.

2. The arrangement of the recorder of the number of coins introduced.

In the accompanying drawings given by way of example:

Fig. 3 is a view corresponding to Fig. 1, the loose pinions system being removed. The drum and the plate carrying the inlet slot are moreover separated from the body of the mechanism.

Figs. 4 and 5 are cross-sections of the mechanism, the parts being in position ready to receive a coin (Fig. 4) or, after having received a coin, having experienced an angular movement which must bring about the movement of a tooth of the ratchet wheel secured to the loose pinion system (Fig. 5).

Fig. 6 is a view corresponding to Fig. 4, the drum of the arrangement having been changed for adapting the advance payment mechanism to coins of a smaller diameter.

Figure 1:
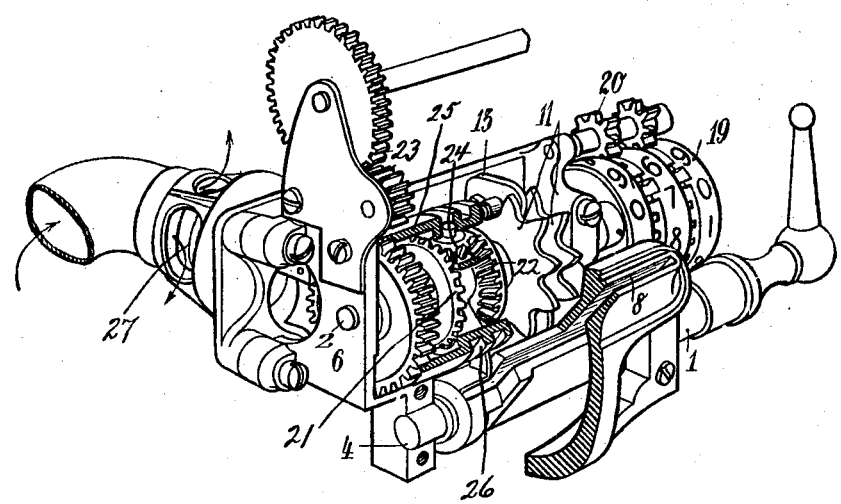
Figures 1 and 2 show respectively in front and rear elevation, in perspective, a construction of the improved mechanism according to this invention.
Figure 2:
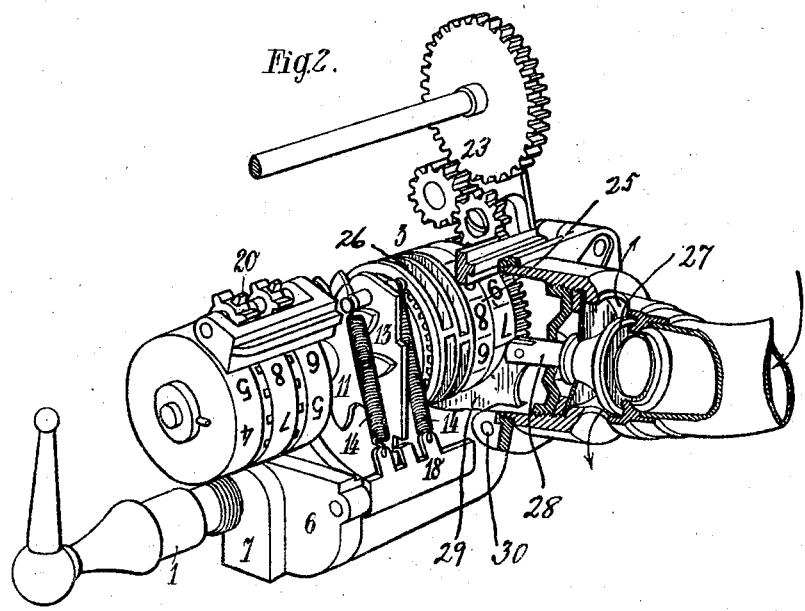

The mechanism is constituted by a differential gear, the wheels 21, 22, of which are keyed respectively to the spindle 2 which the gears 23 connect to the measuring device of the meter, and to the ratchet wheels 11. The wheels 21, 22, gear with loose pinions 24, the axes of which are oppositely arranged within the drum 25 carrying numbered divisions and also the cam 26 controlling the gas valve 27 of the meter. The cam 26 acts on the rod 28 of the latter by means of a fork 29 hinged at 30 to the frame of the mechanism so as to keep the valve 27 open so long as the volume of fluid corresponding to the number of coins introduced into the apparatus has not been exhausted.

*Drum, coin chute and safety lever.*—The drum 1 arranged at the bottom portion of the mechanism parallel to the spindle 2 of the differential gear is arranged so as to be easily removable. To that end, each of its ends rotates in two half bearings 4; 5, one forming part of the frame 6 of the apparatus, and the other of the plate 7 carrying the coin chute 8 and secured in its turn to the frame by screws. By removing the said screws, it is therefore possible to withdraw simultaneously the plate 7 and the drum 1. The result is that, if the mechanism is stopped by a coin of excessive size or by a deformed coin introduced with force, it is very easy to get access to the drum 1 for removing the defective coin, without touching the other parts. Moreover, if the mechanism built for receiving a coin of a given type, is to be adapted for coins of different dimensions, it is sufficient to remove the drum 1 and the coin chute 8, and to replace them by two other parts of shape and dimensions suitable for the new coin to be used. This change can be made in a few seconds and at low cost, all the parts other than the drum 1 and the coin chute remaining in place.

By way of example Figs. 4–6 show: the Figs. 4 and 5 a mechanism designed for coins of 30 mm. in diameter, and Fig. 6 the same mechanism converted for coins of only 15 mm. after the drum 1 and the coin chute 8 have been replaced. As shown in the Fig. 6 the coin drum corresponding to the coin of 15 mm. is provided with a projection 9 with which engages and about which pivots the part 10 while it rotates with the drum 1. This projection enables the coin of 15 mm. to engage with the teeth of the ratchet wheel 11 to the same extent as the coin of 30 mm. and consequently to advance, like the latter, the said ratchet wheel to the extent of one tooth in spite of its smaller diameter.

The drum 1 is moreover combined with an engagement lever 12 which is a double acting one. This lever, first of all, makes impossible the known fraud consisting in operating the mechanism by means of a counter or the like replacing the ordinary coin, arranged in such a manner that it could operate the mechanism as many times as desired, and be withdrawn afterward through the coin chute 8 after the drum 1 has been moved backward.

In the second place, the same lever 12 prevents the pawl 13 of the ratchet wheel 11, from being raised by a hook or other suitable tool, which would prevent the valve from closing, so that the meter could deliver gas indefinitely without it being necessary to introduce coins into the apparatus.

The first of these two functions of the lever 12 is insured by its arm which, in the position of rest, is held in the position shown in Fig. 4 by means of the spring 14 used for returning the pawl 13 into the position in which it locks the ratchet wheel 11 after the passage of each coin.

When the drum 1 is operated, it raises, by means of its tappet 15, the arm 12 which, after a suitable angular movement of the said drum, engages with a stop notch 16 (Fig. 4), thus preventing any return of the drum 1 and of the coin, whether good or bad, that it may contain. If the drum 1 is turned farther, the arm 12 arrives in front of a recess made in the drum, which enables the lever 12 to become completely disengaged and to return to its initial position under the action of the spring 14. But this disengagement takes place only after the ratchet wheel 11, having advanced to the extent of one tooth, is again held by its pawl 13 in such a position that it prevents any movement backward of the coin contained in the drum 1.

It is therefore necessary, in order to enable the drum 1 to return backward, that it should have completed the whole of its travel, even if no coin has been introduced into it.

In these conditions, it is obvious that any coin, arranged or not for the purpose of fraud, cannot be withdrawn after it has acted on the ratchet wheel 11, because, long before the movement when the said action begins, its return will be rendered impossible by the engagement lever 12 which, by holding the drum 1, will hold the coin itself.

If, after the drum 1 is engaged, it is left in that position, the coin will remain in the mechanism. If, on the contrary, the drum is caused to travel the last portion of its travel, the coin will be projected into the receiving box, so that in case of a fraudulent attempt, the agent intrusted with collecting, will find the proof either in the mechanism or in the box of the apparatus.

The second of the two functions of the lever 12 is played by its heel or projection 18 which, when the mechanism is in the position of rest, engages with the locking pawl 13 which cannot therefore be raised unless the heel 18 has been previously disengaged. In order to produce the said disengagement, it is indispensable to turn the drum 1 to a certain extent, in order that it should raise the arm 12 of the lever and thus move the heel 18 until it is entirely outside the locking pawl 13 (Fig. 5). As soon as the drum 1 has been turned to a slight extent, the slot of the same will be no longer opposite the chute 8 which will be thus closed, without it being possible to introduce into the mechanism any tool for forcing it.

The above description can be summed up as follows:

When the mechanism is in the position of rest (Fig. 4), it is impossible to raise the locking pawl 13 by a hook or any other tool, the said pawl being locked by the heel or projection 18 of the lever 12. When the projection 18 is disengaged, the introduction of a tool is rendered impossible, owing to the movement which it became necessary to impart to the drum 1 for producing the said disengagement.

It must be pointed out—and this constitutes one of the characteristic features of the apparatus—that the device for returning the engagement lever 12 does not contain any spring adapted for the purpose because it is effected by the spring 14 of the locking pawl 13 of the ratchet wheel 11, the said spring thus playing a double part.

*Totalizer.*—The totalizer 19 for recording the number of coins introduced, instead of being combined, as in ordinary mechanisms, with the other parts of the apparatus, is completely independent of the same. It is arranged on the spindle 2 common to the loose pinion system 22 and to the ratchet wheel 11, and is entirely outside the frame 6 in which are inclosed the other parts of the mechanism, so that it is sufficient to withdraw one or two pins, in order to enable all the figure drums 19 as well as their pinions 20 to be removed in order to bring them instantaneously to 0 or to any other figure.

What I claim as my invention and desire to secure by Letters Patent is:—

1. In a payment in advance meter comprising a differential gear, the combination of a drum adapted to receive coins, a ratchet wheel driven by said drum through the intermediary of a coin, a tappet on the said drum, an arm or lever adapted to be acted upon by the tappet, a spring exercising antagonistic action on the said arm or lever, a locking pawl for the ratchet wheel adapted to be engaged by the aforesaid arm or lever when the mechanism is at rest, and means for operating the gas valve.

2. In a payment in advance meter comprising a differential gear, the combination of a drum adapted to receive coins, a ratchet wheel driven by said drum through the intermediary of a coin, a tappet on the said drum, an arm or lever adapted to be acted upon by the tappet, an engagement projection on the said arm or lever, a locking pawl for the ratchet wheel adapted to be engaged by the said projection on the lever when the mechanism is at rest, a notch on said pawl, an antagonistic spring acting on the lever, and means for operating the gas valve.

3. In a payment in advance meter comprising a differential gear, the combination of a drum adapted to receive coins, a ratchet wheel driven by said drum through the intermediary of a coin, a tappet on the said drum, an arm or lever adapted to be acted upon by the tappet, an engagement projection on the said arm or lever, a locking pawl for the ratchet wheel adapted to be engaged by the said projection on the lever when the mechanism is at rest, a notch on said pawl, an antagonistic spring acting on the lever, a detachable supporting plate containing the coin introducing slot and forming bearings for supporting the drum, and means for operating the gas valve.

4. In a payment in advance meter comprising a differential gear, the combination of a drum adapted to receive coins, a ratchet wheel driven by said drum through the intermediary of a coin, a tappet on the said drum, an arm or lever adapted to be acted upon by the tappet, an engagement projection on the said arm or lever, a locking pawl for the ratchet wheel adapted to be engaged by the said projection on the lever when the mechanism is at rest, a notch on said pawl, an antagonistic spring acting on the lever, a detachable supporting plate containing the coin introducing slot and forming bearings for supporting the drum, said drum having a groove therein, an extension on the plate on which the coin rests, and means for operating the gas valve.

In testimony whereof I have signed my name to this specification in the presence of two subscribing witnesses.

GEORGE HEELEY.

Witnesses:
GEORGES BONNEVIL,
LUCIEN MEMMINGER.